United States Patent
Nose et al.

(10) Patent No.: US 9,905,817 B2
(45) Date of Patent: Feb. 27, 2018

(54) RESIN-METAL COMPOSITE SEAL CONTAINER AND METHOD FOR PRODUCING SAME

(71) Applicants: NIPPON STEEL & SUMIKIN MATERIALS CO., LTD., Tokyo (JP); HONDA MOTOR CO., LTD., Tokyo (JP)

(72) Inventors: Koichi Nose, Tokyo (JP); Jun Nakatsuka, Tokyo (JP); Yutaka Matsuzawa, Wako (JP); Yu Murai, Wako (JP)

(73) Assignees: NIPPON STEEL & SUMIKIN MATERIALS CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 547 days.

(21) Appl. No.: 14/382,897

(22) PCT Filed: Feb. 21, 2013

(86) PCT No.: PCT/JP2013/054368
§ 371 (c)(1),
(2) Date: Sep. 4, 2014

(87) PCT Pub. No.: WO2013/133039
PCT Pub. Date: Sep. 12, 2013

(65) Prior Publication Data
US 2015/0030912 A1    Jan. 29, 2015

(30) Foreign Application Priority Data
Mar. 5, 2012 (JP) .................................. 2012-048432
Aug. 9, 2012 (WO) .................. PCT/JP2012/070386

(51) Int. Cl.
*H01M 2/02* (2006.01)
*H01M 2/06* (2006.01)
(Continued)

(52) U.S. Cl.
CPC ............ *H01M 2/0285* (2013.01); *H01G 9/10* (2013.01); *H01G 9/145* (2013.01); *H01G 11/80* (2013.01);
(Continued)

(58) Field of Classification Search
CPC ...................................................... H01M 2/021
See application file for complete search history.

(56) References Cited

U.S. PATENT DOCUMENTS 5,502,292 A    3/1996 Pernicka et al.
6,531,246 B2 *  3/2003 Hanafusa ............ H01M 2/0207
                                          429/162

(Continued)

FOREIGN PATENT DOCUMENTS

JP    2000-153577 A    6/2000
JP    2000-223090 A    8/2000
(Continued)

OTHER PUBLICATIONS

Extended European Search Report, dated Apr. 11, 2016, for European Application No. 13757877.9.
(Continued)

*Primary Examiner* — Alix E Eggerding
(74) *Attorney, Agent, or Firm* — Birch, Stewart, Kolasch & Birch, LLP

(57) ABSTRACT

A resin-metal composite sealed container having a heat seal part using a heat-sealing resin, between an end part of a first metal foil and an end part of a second metal foil, and a metallically sealed part with a weld bead, on the end face outside the heat sealed part of the first metal foil and the (Continued)

second metal foil. The resin-metal composite sealed container, wherein the melting point of the metal constituting the metal foil is higher by 300° C. or more than the thermal decomposition temperature of the heat-sealing resin, the specific gravity of the metal constituting the metal foil is 5 or more, and the weld bead is formed by a laser welding. A method for producing a metal-resin composite sealed container, comprising forming a container by heat sealing end parts of metal foils having laminated on at least one surface thereof a heat-sealing resin, and forming a metallically sealed part with a weld bead on the end faces of the metal foils by heating/welding an outer side of the heat sealed part of the container from a side of the end faces of the metal foils.

12 Claims, 7 Drawing Sheets

(51) Int. Cl.
*H01G 11/80* (2013.01)
*H01G 11/84* (2013.01)
*H01G 9/10* (2006.01)
*H01G 9/145* (2006.01)
*H01G 13/00* (2013.01)

(52) U.S. Cl.
CPC ............ *H01G 11/84* (2013.01); *H01G 13/00* (2013.01); *H01G 13/003* (2013.01); *H01M 2/026* (2013.01); *H01M 2/0207* (2013.01); *H01M 2/0267* (2013.01); *H01M 2/0272* (2013.01); *H01M 2/0287* (2013.01); *H01M 2/06* (2013.01); *H01M 2220/30* (2013.01); *Y02E 60/13* (2013.01); *Y10T 29/4911* (2015.01)

(56) References Cited

U.S. PATENT DOCUMENTS

| | | | |
|---|---|---|---|
| 7,285,334 | B1 | 10/2007 | Yamashita et al. |
| 2004/0166406 | A1* | 8/2004 | Higuchi ............... H01M 2/021 |
| | | | 429/171 |
| 2006/0207085 | A1 | 9/2006 | Nakagawa et al. |
| 2010/0258538 | A1 | 10/2010 | Suzuki et al. |

FOREIGN PATENT DOCUMENTS

| | | |
|---|---|---|
| JP | 2000-340187 A | 12/2000 |
| JP | 2004-055154 A | 2/2004 |
| JP | 2004-095217 A | 3/2004 |
| JP | 2004-296323 A | 10/2004 |
| JP | 2008-21634 A | 1/2008 |
| JP | 2010-86744 A | 4/2010 |

OTHER PUBLICATIONS

International Search Report issued in PCT/JP2013/054368, dated May 21, 2013.

* cited by examiner

RESIN-METAL COMPOSITE SEAL CONTAINER AND METHOD FOR PRODUCING SAME

TECHNICAL FIELD

The present invention relates to a resin-metal composite sealed container having a seal part metallically sealed by a weld bead at an outer location than a heat seal part, which is obtained by applying heat sealing and then partially laser-welding the heat-sealed portion, and a production method thereof, and this container is used particularly for storage cell application.

BACKGROUND ART

Cases for a storage device such as a storage battery and a capacitor are roughly classified into two types, i.e., mainly, a type where a cylindrical or rectangular can is formed using a metal plate by press working, clamping, laser welding, etc., and a pouch type where a resin film having a metal foil as a gas barrier layer is used and heat-sealed to form a case (in this case, the case is soft and therefore, is also referred to as a bag body).

The battery of a pouch type is used in a state that a storage device part is cut off from the outside world by wrapping the storage device by metal foils each laminated with a heat-sealing resin (laminated metal foils) and heat-sealing the heat-sealing resins thereof to each other. This is because leakage of an electrolytic solution of a battery to the outside or mingling of water vapor into a battery from the environment is fatal to the battery life.

However, in the case of a conventional battery cell where laminated metal foils are joined only by heat sealing, the heat-sealed portion may serve as a leakage path for an electrolytic solution within the battery or an intrusion path through which water vapor or the like enters into the inside of the battery from the external environment, and the path length of the heat seal part contributes to determination of the life of the battery cell. Therefore, for extending the life of the battery cell, it may be effective to elongate the path length of the heat seal part, but on the other hand, when the path length of the heat seal part is elongated, a useless space is increased and the cell capacity per space is decreased. Accordingly, in the battery cell using a laminate pack joined by heat sealing, a trade-off relationship exists between the cell capacity per unit space and the battery life.

Incidentally, a laminated aluminum foil has been heretofore employed as the laminated metal foil used in the pouch-type battery case. This is related to the characteristics of aluminum, i.e., ease of obtaining a thin metal foil, and at the same time, related to the fact that the pouch-type case has been developed from a resin pouch/bag body for food packaging. More specifically, in a food packaging pouch/bag, aluminum has been deposited as a barrier layer so as to impart a gas barrier property and thereby extend the life of food. In the case of applying this pouch/bag to a lightweight battery container capable of being easily joined by heat sealing, since the gas barrier property required of, among others, a lithium ion battery or the like using a non-aqueous electrolyte is by far higher than that for food, the reliability of the gas barrier layer must be enhanced. To meet this requirement, the thickness of the gas barrier layer of aluminum has been increased, and as a result, the application of an aluminum deposited film has been shifted to the application of an aluminum foil.

For example, Patent Document 1 (Kokai (Japanese Unexamined Patent Publication) No. 2010-086744) discloses "a packaging material for an electrochemical cell, fabricated by sequentially stacking at least a base material layer, a metal foil layer with a chemical conversion-treated surface, an acid-modified polyolefin layer and a thermal adhesive resin layer", as an outer package for hermetically housing an electrochemical cell body such as a lithium ion battery body, a capacitor and an electric double-layer capacitor or as a packaging medium for a battery housing. In this technique, the "base material layer" is a resin film, and it is understood only from this expression that the role of the metal foil layer is incidental. Actually, in the description, it is said that "the metal foil layer 12 is a layer for preventing intrusion of water vapor into the inside of the lithium battery from the outside".

Patent Document 2 (Kokai No. 2000-340187) describes, as a packaging material for a polymer battery, " . . . a packaging material for a polymer battery, consisting of an outermost layer/a barrier layer/an intermediate layer/an innermost layer", and clearly specifies that the metal foil layer (aluminum foil layer) is a barrier layer.

Patent Document 3 (Kokai No. 2000-153577) also states that other than an aluminum foil disclosed as a working example of the metal foil of a heat-sealing laminate, a stainless steel foil can be used.

However, the junction part heat-sealed by the resin laminated is disadvantageous in that since the heat seal part is not formed of a metal, the junction part is composed of only a resin and does not have a gas barrier property comparable to that of other portions having a metal layer as a barrier layer or of a junction part composed of a metal, such as welded metal can, and a sufficient gas barrier property cannot be exerted particularly in a battery where intrusion of water has a fatal effect on the life and therefore, a high gas barrier property is required.

In this connection, a method of welding a laminated metal foil and thereby applying sealing with a resin and sealing with a metal is disclosed in Patent Document 4 (Kokai No. 2000-223090) and Patent Document 5 (Kokai No. 2008-021634).

The method of Patent Document 4 is a method where in a laminate cell that is folded in half and sealed at its circumference two sides are welded to enhance the gas barrier property.

However, in the case of welding a laminated metal by melting the metal, the welding by an ultrasonic wave or conduction heating requires metals to come into direct contact with each other, and welding by a heat source using a laser or a discharge arc has a problem that the molten metal is blown off due to evaporation of the resin and a sound weld bead can be hardly formed.

Therefore, Patent Document 4 sets forth, in paragraph [0007] of [Means to Solve the Problems], a description of "on the outer side, the heat-fusible resin film layer is removed to expose the metal foil surface and metal foils are laid one on another and welded", and a step of previously removing the resin in the portion to be welded, like the W part in FIG. 4(c) of Patent Document 4, is indispensable. Furthermore, a method for removing the heat-fusible resin film as above and a method for pressing and superposing the portions to be welded are additionally required.

In Patent Document 5, also as shown in FIGS. 2 and 3, a step of providing a taper on the end face and previously removing the resin inside the portion to be welded is necessary.

In addition, the normal welding method is generally a welding method where as in FIG. 4(e) of Patent Document 4, a weld metal is formed between metal foils put into contact, but this method has an additional problem that occurrence of a welding defect can be hardly detected and it is difficult to guarantee the soundness of the weld part so as to ensure the barrier property.

RELATED ART

Patent Document

Patent Document 1: Kokai (Japanese Unexamined Patent Publication) No. 2010-086744
Patent Document 2: Kokai No. 2000-340187
Patent Document 3: Kokai No. 2000-153577
Patent Document 4: Kokai No. 2000-223090
Patent Document 5: Kokai No. 2008-021634

SUMMARY OF THE INVENTION

Problems to be Solved by the Invention

The junction part heat-sealed by a laminated resin is disadvantageous in that since the heat seal part is not formed of a metal, the junction part is composed of only a resin and does not have a gas barrier property comparable to that of other portions having a metal layer as a barrier layer or of a junction part composed of a metal, such as a welded metal can, and a sufficient gas barrier property cannot be exerted particularly in a battery where intrusion of water has a fatal effect on the life and, therefore, a high gas barrier property is required. When welding of a metal layer is tried so as to overcome this problem, there arises a problem that the resin in the periphery of the weld part need to be removed or because of the presence of the weld part between metal layers, a welding defect is difficult to evaluate/detect.

An object of the present invention is to provide a resin-metal composite seal container having both a seal part by a metallically welded part and a heat seal part, enabling configuration of a junction part realizing a high gas barrier property, and a production method thereof, in an inexpensive and efficient manner/mode facilitating the defect detection.

Means to Solve the Problems

The present inventors have found that a high gas barrier property can be realized by further using laser bonding in combination with the heat seal part composed of a laminated resin.

However, in a material coated with a substance in which the boiling point or thermal decomposition temperature of the coating substance (zinc or resin) is lower than the melting point of the base material (steel sheet or metal plate), such as a galvanized steel sheet and a resin-coated metal plate, the coating substance is generally gasified during a laser welding and thereby blows off a weld metal in a molten state, and therefore, it is very difficult to stably form a sound weld junction part.

In most of aminated metal foils, the metal foil thickness is small, and the thickness of a heat-sealing resin and the thickness of a metal foil are at the same level, leading to the conditions such that the percentage of metal melted during welding is small but the distance between metals to be joined by welding is relatively large, which makes the welding more difficult.

To solve such this problem the present inventors have made intensive studies and developments, and as a result, it has been found that when the melting point of the metal constituting a metal foil is sufficiently higher than the thermal decomposition temperature of a laminate resin used for heat sealing and the specific gravity of the metal constituting the metal foil is sufficiently larger than the specific gravity of the laminate resin used for heat sealing, the heat-sealed junction part can be laser-welded without removing the resin near the part to be welded before welding.

Due to this configuration, weld joining of a laminated foil, which has been considered as unrealistic and never been studied, and furthermore, an utterly new container structure having a heat seal part in the inside and also having a weld junction part, can be realized without removing the resin near the part to be welded before welding.

The present invention has been accomplished based on the finding above, and its gist resides in the following.

(1) A resin-metal composite sealed container having:
a first metal foil having an end part,
a second metal foil having an end part,
a heat sealed part using a heat-sealing resin, between the end part of the first metal foil and the end part of the second metal foil, and
a metallically sealed part with a weld bead, on an end face outside the heat sealed part of the first metal foil and the second metal foil.

(2) The resin-metal composite sealed container according to (1), wherein:
the melting point of the metal constituting the metal foil is higher by 300° C. or more than the thermal decomposition temperature of the heat-sealing resin,
the specific gravity of the metal constituting the metal foil is 5 or more, and
the weld bead is formed by a laser welding.

(3) The resin-metal composite sealed container according to (1) or (2), wherein the metallically sealed part of the first metal foil and the second metal foil is a weld bead formed by heating the first metal foil and the second metal foil from a side of said end face thereof.

(4) The resin-metal composite sealed container according to any one of (1) to (3), wherein the weld bead is a weld bead having a substantially circular cross-sectional shape and the dimension of the weld bead in the thickness direction of the metal foil is from 1.1 to 5.0 times the thickness-direction dimension of the first metal foil and the second metal foil in the portion coming into contact with the weld bead.

(5) The resin-metal composite sealed container according to any one of (1) to (4), wherein the first metal foil and the second metal foil are bridged by the weld bead and the thickness-direction dimension of the first metal foil and the second metal foil near the weld bead is equal to the thickness-direction dimension of the first metal foil and the second metal foil in the heat seal part.

(6) The resin-metal composite sealed container according to any one of (1) to (5), wherein a heat-sealing resin layer is laminated on at least the inner surface of the first metal foil and at least the inner surface of the second metal foil.

(7) The resin-metal composite sealed container according to any one of (1) to (6), wherein the metallically sealed part is formed on the entire circumference of the end parts of the first metal foil and the second metal foil, excluding an electrode tab portion.

(8) The resin-metal composite sealed container according to (1) to (7), wherein the metal foil is a stainless steel foil and the heat-sealing resin is a resin mainly composed of polypropylene.

(9) The resin-metal composite sealed container according to (1) to (8), wherein the metal foil has a thickness of 15 to 150 µm and the heat-sealing resin has a thickness of 10 to 200 µm.

(10) A method for producing a metal-resin composite sealed container, comprising:

forming a container by subjecting end parts of metal foils having laminated on at least one surface thereof a heat-sealing resin to sealing by heat sealing, and forming a matallically sealed part with a weld bead on the end faces of the metal foils by heating/welding an outer location than the heat sealed part of the container from a side of the end faces of the metal foils without removing the resin near a part to be welded before welding.

(11) The method according to (11), wherein:

the melting point of the metal constituting the metal foils is higher by 300° C. or more than the thermal decomposition temperature of the heat-sealing resin, the specific gravity of the metal constituting the metal foil is 5 or more, and the weld bead is formed by a laser welding.

Effects of the Invention

According to the resin-metal composite sealed container of the present invention, a heat sealed part composed of a laminated resin and a laser welded part can be used in combination, and a structure producing a remarkable effect that the barrier property against an electrolytic solution or a gas typified by water vapor is dramatically increased by a seal part composed of a metal, and producing a remarkable effect that when almost all of the circumference of the heat sealed part can be welded, significant life extension becomes possible, can be realized in a mode of not requiring separation of the resin in the weld part before welding and facilitating the detection of a defect in the weld part after welding.

MODE FOR CARRYING OUT THE INVENTION

First Embodiment

The first embodiment is a metal-resin composite sealed container formed by heat sealing end parts of metal foils having laminated on at least one surface thereof a heat-sealing resin, which is characterized by further having a sealed part metallically sealed by a weld bead on the metal foil end faces outside the heat sealed part.

Figure 1:
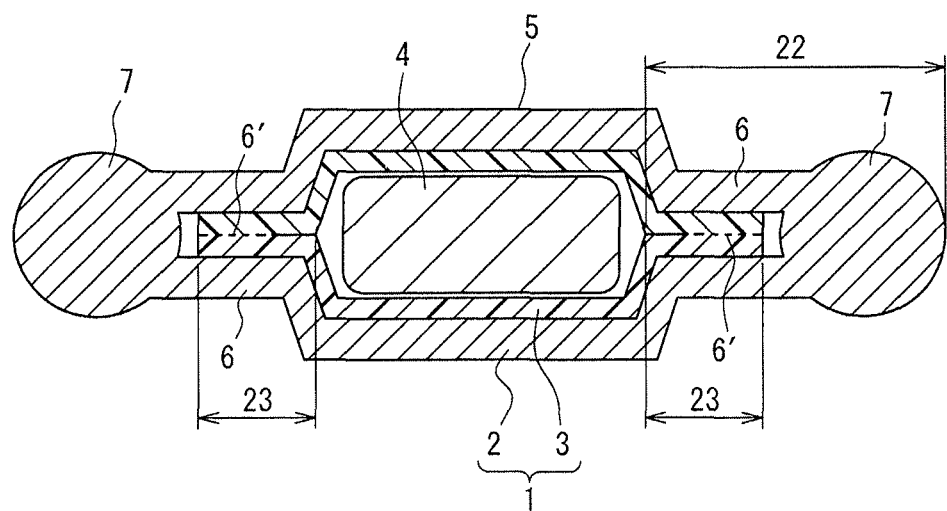
FIG. 1 A cross-sectional schematic view illustrating an example of the structure of a resin-metal composite sealed container of the present invention.

FIG. 1 illustrates a structure example of a resin-metal composite sealed container of the present invention. The container has a resin-metal composite sealed structure where metal foils 6 are metal-bonded in a metallically sealed part 7 which is laser-welded from a side of the end faces of the metal foils and, in the inside thereof, further resin-bonded in a heat seal part 6' which is formed by heat sealing using a heat seal resin 3.

The container of the present invention can be produced using a laminated metal foil for laser welding, in which the melting point of the metal constituting the metal foil is higher by 300° C. or more than the thermal decomposition temperature of the heat-sealing resin and the specific gravity of the metal constituting the metal foil is 5 or more, by applying laser welding from a side of the metal foil end faces after heat sealing.

For example, the container of the present invention can be realized by using a stainless steel foil as the metal foil and using a resin mainly composed of polypropylene as the heat-sealing resin.

(Laser Welding Part)

The objective in the laser welding is to form a battery cell by heat sealing, followed by welding the metal on the outside thereof without destroying the resin-bonded container structure configured by heat sealing, and thereby fabricate a battery cell.

However, in the case of an aluminum laminate foil conventionally employed, as taught in Patent Documents 4 and 5, a sound weld bead cannot be obtained by welding without a pretreatment of removing the resin in the weld part.

The cause thereof was analyzed, as a result, it was found that at the time of melting of aluminum by laser irradiation, the laminate resin is evaporated simultaneously and the molten aluminum is blown off (hereinafter, referred to as "explosion") by an evaporating gas of this resin, leading to a failure in the formation of a sound weld bead.

As the mode of explosion, a bead that is full of harsh and gaping blow holes may be formed, a stitch-like discontinuous bead may be formed, or in a worse case, most of the molten metal may be blown off, providing a cleaved state, despite an intension to achieve welding.

Generally, in a material coated with a substance, such as a galvanized steel sheet and resin-coated metal plate, where the boiling point or thermal decomposition temperature of the coating substance (zinc or resin) is lower than the melting point of the base material (steel sheet or metal plate), the gasified coating substance blows off a weld metal in a molten state to cause the explosion.

In the case of laser welding of a galvanized steel sheet, a most effective method for avoiding explosion is to provide gas escape spaces at regular intervals between steel sheets abutted and welded. However, this method cannot be applied to the abutting part of laminated metal foils put into close contact by heat sealing.

In the case of using a laminated foil other than an aluminum laminate foil, as taught in Patent Documents 4 and 5, the pretreatment of removing the resin in the weld part is considered to be indispensable, and a method of welding the foils without a pretreatment of removing the resin in the weld part has not been instructed.

The present inventors have made detailed studies on the laser welding method for a laminated metal foil and thought of a method to avoid explosion of a laminated metal foil by making use of the difference in the properties of the substance responsible for explosion between the plated steel sheet and the laminated metal foil, and as a result of experiments and discussions, the present invention has been accomplished.

The conditions of causing no explosion attributable to a gas resulting from thermal decomposition of the resin have been studied, and it has been found that when the melting point of the metal constituting the metal foil is higher by 300° C. or more than the decomposition temperature of the heat-sealing resin and the specific gravity of the metal constituting the metal foil is 5 or more, the explosion is less likely to occur. Although the principle thereof need to be further analyzed for the purpose of accuracy, it is qualitatively presumed that a larger difference between the melting point of the metal and the decomposition temperature of the resin leads to a greater time lag after the resin decomposes to evolve a gas until the metal melts and even when a gas is evolved during melting of the metal, the large specific gravity makes the metal less susceptible to the effect of the gas.

Figure 5:
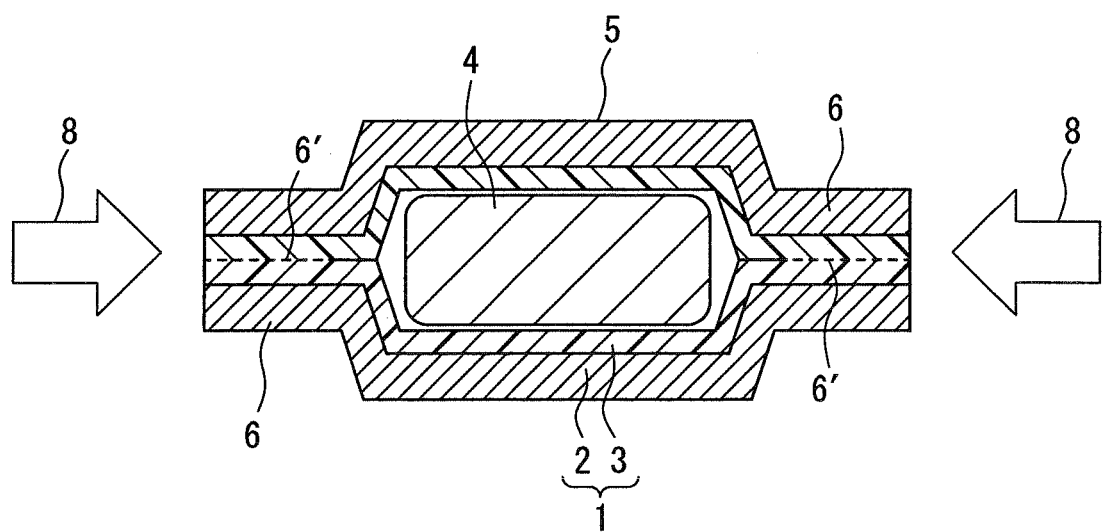
FIG. 5 An A-A' cross-sectional view of FIG. 3B, showing the relationship between the heat sealed part and the laser irradiation direction of laser welding.
Figure 8A:
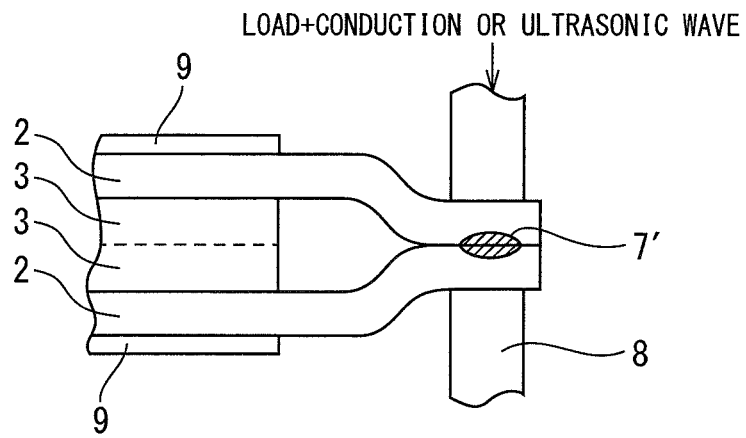
FIG. 8A A view for explaining a conduction welding or ultrasonic wave welding.
Figure 8B:
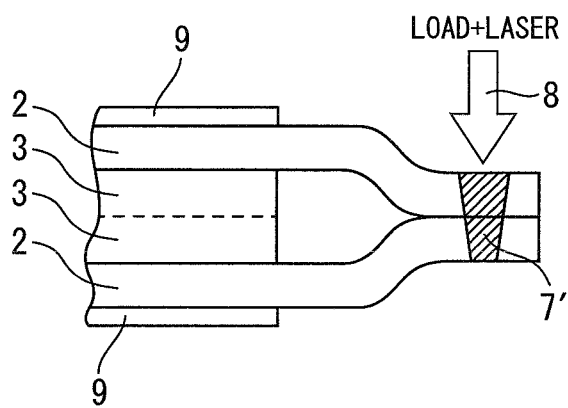
FIG. 8B A view for explaining the laser welding method of carrying out the welding by emitting laser radiation from a direction nearly perpendicular to superposed layers toward a direction penetrating respective layers.
Figure 8C:
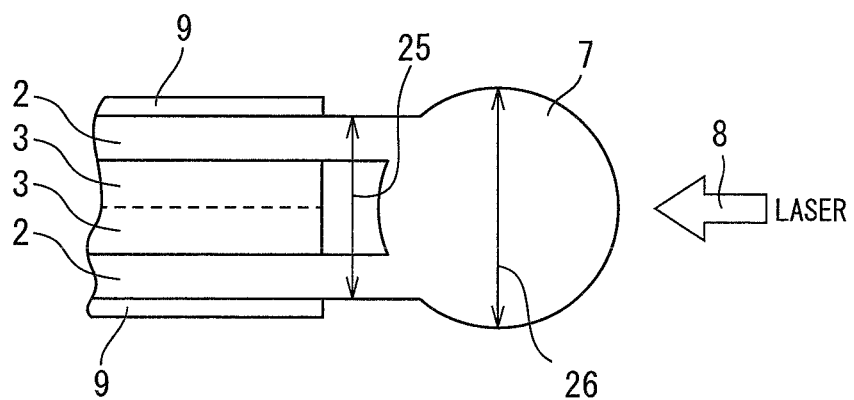
FIG. 8C A view for explaining "Ogami-welding (bow-the-knee welding)" of emitting a laser beam from a direction parallel to superposed layers toward an end face of the superposing part.

Furthermore, as for the welding method, it has been confirmed that a sound weld part can be formed by employing "Ogami-welding (bow-the-knee welding)" of emitting laser radiation from a direction parallel to superposed layers toward end faces of the superposing part shown in FIG. 8C or FIG. 5, instead of employing conduction welding or ultrasonic wave welding of FIG. 8A and a laser welding method of carrying out the welding by emitting laser radiation from a direction nearly perpendicular to superposed layers toward a direction penetrating respective layers of FIG. 8B, which are a normal welding method for a superposing part. This is attributable to the fact that the amount of molten metal can be increased in the Ogami-welding and, therefore, even when a gap of the superposing part to be welded is slightly large, a welded metal part is easily formed by bridging the superposed metals, and additionally attributable to the effect of selecting such a resin and a metal as in the present invention to thereby select materials capable of suppressing explosion by evaporation of a resin.

Figure 9A:
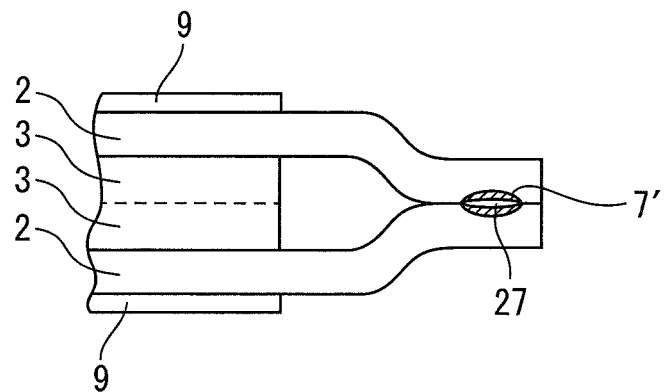
FIG. 9A A view for explaining a welding defect in the weld part, which is formed in the welding method of FIG. 8A or FIG. 8B.
Figure 9B:
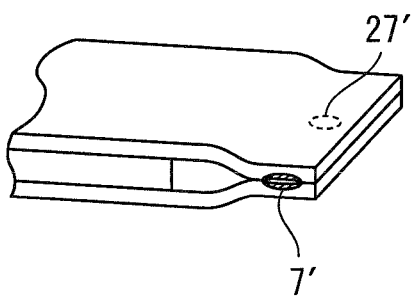
FIG. 9B A view for explaining a welding defect in the weld part, which is formed in the welding method of FIG. 8A or FIG. 8B.
Figure 9C:
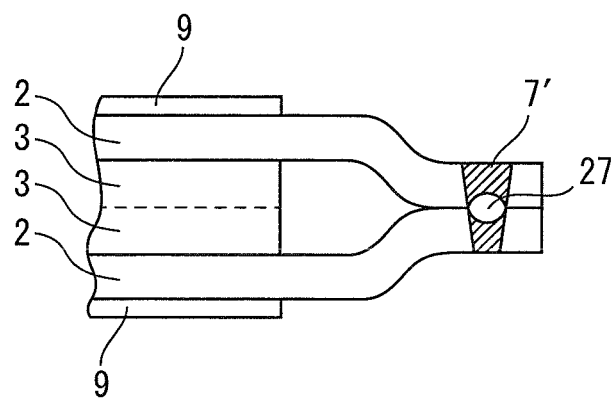
FIG. 9C A view for explaining a welding defect in the weld part, which is formed in the welding method of FIG. 8A or FIG. 8B.
Figure 9D:
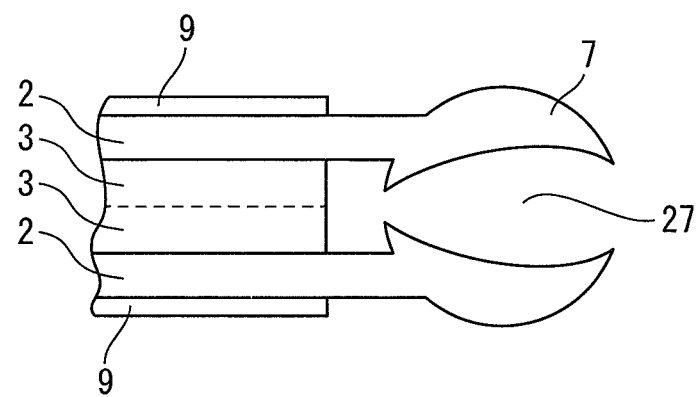
FIG. 9D A view for explaining a welding defect in the weld part, which is formed in the welding method of FIG. 8A or FIG. 8B.
Figure 9E:
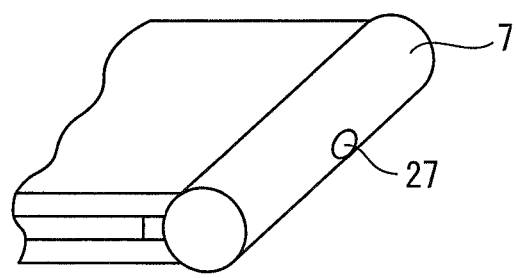
FIG. 9E A view for explaining a welding defect in the weld part, which is formed in the welding method of FIG. 8A or FIG. 8B.

Furthermore, the Ogami-welding advantageously has a remarkable effect that when the weld metal is sufficiently formed, the presence or absence of a defect after welding can be detected/evaluated from the outer appearance. In the conduction heating or penetration laser welding, even when a defect 27 as in FIG. 9A or FIG. 9B is present, this cannot be judged from the outer appearance as in FIG. 9C, but a penetration defect in Ogami-welding can be easily detected/judged from the outer appearance as in FIG. 9D and FIG. 9E, because an opening 27 is present in the outer appearance as in FIG. 9D and FIG. 9E.

Figure 4:
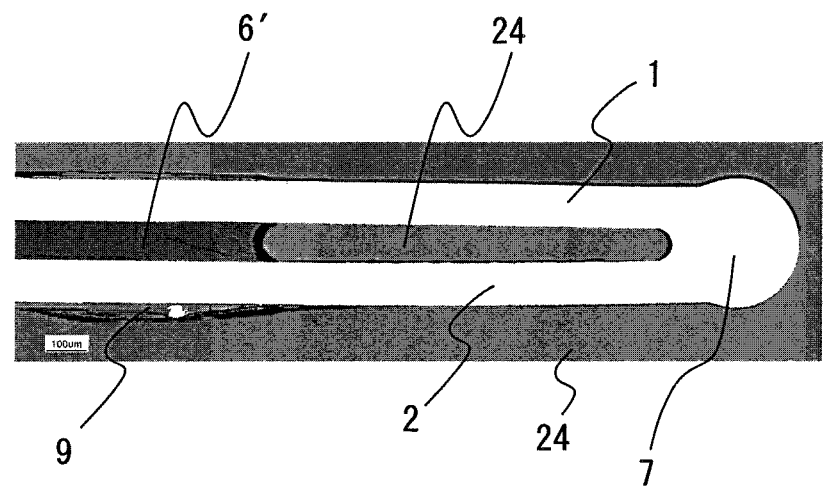
FIG. 4 A photograph of a cross-section of the neighborhood of the welded part in FIGS. 3A and 3B.
Figure 6:
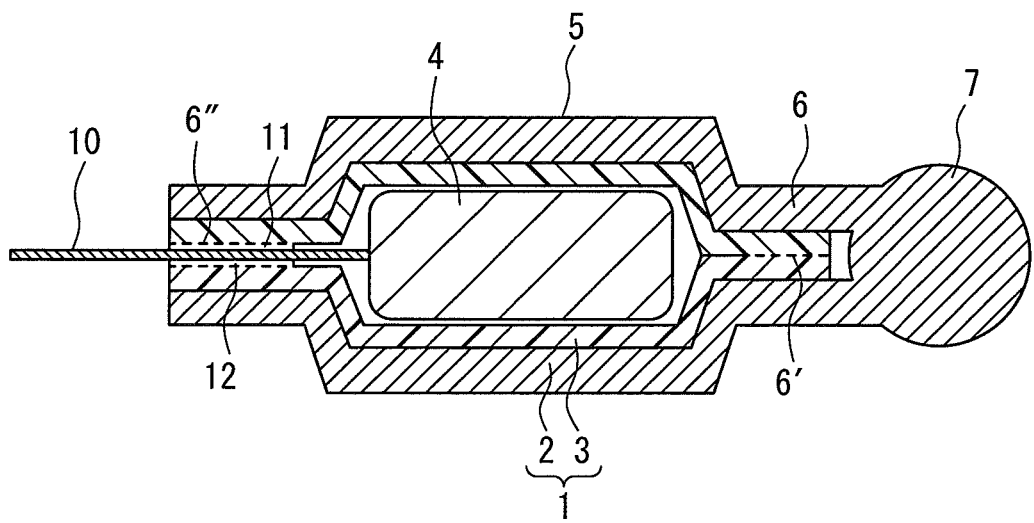
FIG. 6 A B-B' cross-sectional view of FIG. 3B.

In order to facilitate the detection of a welding defect 27, it is effective to form the molten metal part such that the cross-section thereof becomes circular as in FIGS. 1, 4 and 6, and for satisfying this condition, the weld part end must be sufficiently melted so that the diameter (26 of FIG. 8C) of the circular part of the weld metal can be larger than the distance (25 of FIG. 8C) between outer surfaces of original two metal layers. In the Ogami-welding configuration, the condition above can be easily achieved as in the cross-sectional photograph of FIG. 4.

The diameter of the weld metal is preferably 110% or more of the distance or length between two metal layers. As long as space allows, a large diameter of up to about 500% may cause no problem, but a diameter larger than that may lead to an increase in the load on the foil near the weld part and the reliability may conversely drop. There is substantially no problem even when the distance or length between two metal layers is replaced by the total of the total thickness of two metal foils and the thickness of the heat-sealing resin.

In the present invention, the method for forming a weld bead may be sufficient if it is a method of carrying out the welding by heating metal foils from a side of the end faces of the metal foils, and this method is referred to also as "Ogami-welding". A welding method of emitting laser radiation from a direction parallel to superposed layers is preferred, but the direction is not limited to a completely parallel direction. As long as a weld bead can be formed by heating from a side of the end faces of the metal foils, a welding method of heating by a method other than laser irradiation may also be employed.

According to the method of the present invention where a combination of specific metal foils and a heat seal resin are used and a weld bead is formed from the end face side of the metal foils, a weld bead having a substantially circular cross-sectional shape can be formed as shown in FIGS. 1, 4 and 6. Regarding the substantially circular cross-sectional shape, the weld bead may have a substantially circular shape on the end face side but is integrated with the metal foils inside the container as seen in the photograph of FIG. 4. As a result, a structure where metal foils welded run nearly in parallel to each other with spacing corresponding to the thickness of the laminated heat seal resin layer and are bridged therebetween by the weld bead, can be formed, and the thickness-direction (the direction perpendicular to the metal foils) dimension of the metal foils near the weld bead is equal to the thickness-direction dimension of the metal foils in the heat seal part. The term "equal" means that the difference is 20% or less, and in particular 10% or less. However, it should be kept in mind that the present invention is not limited to this embodiment (the embodiment where both dimensions are equal). In the present invention, a pretreatment of removing the heat seal resin between metal foils before welding is not necessary, but the heat seal resin near the weld bead may vaporize and disappear during Ogami-welding.

As described above, the dimension of the weld bead in the thickness direction of the metal foils is preferably larger by 1.1 to 5.0 times, more preferably 1.2 times or more, still more preferably from 1.3 to 3 times, than the thickness-direction dimension of the metal foils in the portion coming into contact with the weld bead.

It has been found that when the metal foil is a stainless steel foil and the heat-sealing resin is a resin mainly composed of polypropylene, the conditions above are satisfied and the utilizability in industry is high. The heat-sealing resin used for storage cell application and serving also as an inner-surface resin is usually, suitably a polyolefin-based resin, and the polyolefin-based resin is a resin containing, as the main component, a resin having a repeating unit of the following (formula 1). The main component means that the resin having a repeating unit of (formula 1) accounts for 50 mass % or more.

$$-CR^1H-CR^2R^3-\qquad\text{(formula 1)}$$

(in formula 1, each of $R^1$ and $R^2$ is independently represents an alkyl group having a carbon number of 1 to 12 or hydrogen, and $R^3$ represents an alkyl group having a carbon number of 1 to 12, an aryl group or hydrogen).

The polyolefin-based resin may be a homopolymer of the above-described constitutional unit or a copolymer of two or more kinds of these constitutional units. Preferably, five or more repeating units are chemically bonded. If the number of repeating units is less than 5, the polymer effect (for example, flexibility and expansibility) can be hardly exerted.

Examples of the repeating unit above include an aliphatic olefin, for example, a repeating unit appearing upon addition polymerization of a terminal olefin, such as propene, 1-butene, 1-pentene, 4-methyl-1-pentene, 1-hexene, 1-octent, 1-decene and 1-dodecene, and a repeating unit when added with isobutene; and an aromatic olefin, for example, an addition polymer unit of a styrene monomer or a styrene-based monomer, e.g., an alkylated styrene such as o-methylstyrene, m-methylstyrene, p-methylstyrene, o-ethylstyrene, m-ethylstyrene, o-ethylstyrene, o-tert-butylstyrene, m-tert-butylstyrene and p-tert-butylstyrene, a halogenated styrene such as monochlorostyrene, and a terminal methylstyrene.

Examples of the homopolymer of such a repeating unit include a homopolymer of a terminal olefin, such as low-density polyethylene, medium-density polyethylene, high-density polyethylene, linear low-density polyethylene, crosslinked polyethylene, polypropylene, polybutene, polypentene, polyhexene, polyoctenylene, polyisoprene and polybutadiene. Examples of the copolymer of the above-described repeating unit include an aliphatic polyolefin such as ethylene-propylene copolymer, ethylene-butene copolymer, ethylene-propylene-hexadiene copolymer and ethylene-propylene-5-ethylidene-2-norbornene copolymer, and an aromatic polyolefin such as styrene-based copolymer, but the copolymer is not limited thereto and may be sufficient if it satisfies the above-described repeating unit. The copolymer may also be either a block copolymer or a random copolymer. One of these resins may be used alone or two or more kinds thereof may be mixed and used.

The polyolefin for use in the present invention may be sufficient as long as the olefin unit described above is the main component, and a substitution product of the unit, i.e., a vinyl monomer, a polar vinyl monomer or a diene monomer, may be copolymerized as a monomer unit or a resin unit. As for the copolymerization composition, the proportion of the monomer or resin unit is 50 mass % or less, preferably 30 mass % or less, based on the above-described olefin unit. If the proportion exceeds 50 mass %, the properties as an olefin-based resin, such as barrier property against corrosion-causing substances, are reduced.

Examples of the polar vinyl monomer include an acrylic acid, an acrylic acid derivative such as methyl acrylate and ethyl acrylate, a methacrylic acid, a methacrylic acid derivative such as methyl methacrylate and ethyl methacrylate, an acrylonitrile, a maleic anhydride, an imide derivative of maleic anhydride, and a vinyl chloride.

In view of handleability and barrier property against corrosion-causing substances, most preferred are a low-density polyethylene, a medium-density polyethylene, a high-density polyethylene, a linear low-density polyethylene, a crosslinked polyethylene, a polypropylene and a mixture of two or more kinds thereof.

As the heat seal resin for use in the present invention, these polyolefin-based resins are generally suitable, but in industry, those mainly composed of polypropylene are more suited in view of cost, distribution, ease of heat lamination, and the like.

The resin mainly composed of polypropylene indicates a resin containing propylene in a ratio of 50 mass % or more and includes, other than a pure polypropylene resin, for example, a resin where various polyethylenes such as low-density polyethylene and high-density polyethylene or polyolefins such as polybutene and polypentene are polymerized in a total ratio of less than 50 mass %. An acid-modified polyolefin may also be polymerized so as to enhance the adherence to the metal foil. The resin may be a block copolymer or a random copolymer, and other than the polypropylene, one kind of an olefin or two or more kinds of olefins may be polymerized as long as the ratio of the predominating polypropylene is 50 mass % or more. Preferably, the ratio of polypropylene is 70 mass % or more, or 90 mass % or more, or the resin is polypropylene itself. As the polymer for polymerization, a polymer capable of lowering the decomposition temperature than that in using polypropylene alone is preferred, and a polyethylene-based resin is more preferred.

On the other hand, in the case of an aluminum laminate foil, the aluminum has a specific gravity of about 2.7 and a melting point of 660° C. and is confirmed to have a relatively light weight and a low melting point, among general-purpose metals. That is, in the case where the laminated metal foil is aluminum laminate foil, unless the heat seal resin near the weld part is removed before welding, the aluminum laminate foil cannot form a sound weld part by laser welding. However, originally, the laminated aluminum foil is advantageous in that the metal can be easily joined by heat sealing, and it is considered that since the starting point is initially deposition of a metal as a gas barrier layer on a resin film, unlike a metal material, studies have not been made on needs and methods to apply welding.

Examples of the metal suitable for the metal foil for welding includes, in addition to stainless steel, pure iron, carbon steel, low-alloy steel, copper, nickel, zirconium, vanadium, aluminum-iron alloy, and zinc-copper alloy. A plated/coated metal coated with a high-melting-point metal is encompassed by the category of the present invention, and specifically, the plated steel includes tin-free steel having a chromium oxide layer and a metal chromium layer, and nickel-plated steel such as a steel having a nickel layer or having a nickel layer and a nickel-iron alloy layer.

(Thermal Decomposition Temperature of Heat-Sealing Resin)

The reason why the melting point of the metal constituting the metal foil must be higher by 300° C. or more than the thermal decomposition temperature of the heat-sealing resin is because if the difference between the thermal decomposition temperature of the heat-sealing resin and the melting point of the metal constituting the metal foil is less than 300° C., there arises a problem of an increase in the explosion frequency. Although the principle thereof need to be further analyzed for the purpose of accuracy, the present inventors presume that as the difference between the melting point of the metal and the decomposition temperature of the resin is larger, when the temperature rises near the weld part in the process of welding, a greater time lag occurs after the resin decomposes to evolve a gas until the metal melts and in turn, the resin decomposition gas causing explosion can be more sufficiently diffused before the metal melts. For this reason, the difference between the melting point of the metal and the decomposition temperature of the resin is preferably large to a certain extent, and more preferably, the melting point of the metal constituting the metal foil is higher by 400° C. or more than the thermal decomposition temperature of the heat-sealing resin. In view of formation of a sound weld part, the melting point of the metal constituting the metal foil is still more preferably higher by 500° C. or more than the thermal decomposition temperature of the heat-sealing resin.

On the other hand, in a practical aspect, if the melting point of the metal constituting the metal foil is higher by 2,000° C. or more than the thermal decomposition temperature of the heat-sealing resin, a huge quantity of heat is required for melting the metal and due to this quantity of heat, the heat seal resin may be thermally decomposed in excess to impair the battery case configuration made up by the resin. For this reason, the difference between the thermal decomposition temperature of the heat-sealing resin and the melting point of the metal constituting the metal foil is preferably 2,000° C. or less. Even if the resin remains, an excessive heat history damages the resin, and therefore, in view of damage to the remaining resin, the difference between the thermal decomposition temperature of the heat-sealing resin and the melting point of the metal constituting the metal foil is more preferably 1,200° C. or less.

The resin suitably usable as the heat seal resin for allowing the melting point of the metal to be higher by 300° C. or more than the thermal decomposition temperature of the heat-sealing resin may be selected from the resins conventionally used for heat sealing by taking into account the thermal decomposition temperature in relation to the melting point of the metal foil but includes, for example, a resin such as polypropylene, polyethylene and a copolymer thereof, and a resin mainly composed of such a resin. The thermal decomposition temperature of polypropylene is 430° C., the thermal decomposition temperature of polyethylene is 450° C., and a copolymer thereof shows a value approximately in the middle therebetween. Incidentally, the decomposition temperature as used herein indicates a temperature at which a mass change of 10% is caused.

(Specific Gravity of Metal)

The reason why the specific gravity of the metal constituting the metal foil must be 5 or more is because if the specific gravity of the metal constituting the metal foil is less than 5, the explosion frequency increases. Although the principle thereof needs to be further analyzed for the purpose of accuracy, it is qualitatively presumed that even if a gas giving rise to explosion is evolved during melting of the metal, when the specific gravity of the metal is large, the metal is highly probably not blown off but remains without succumbing to a pressure of the gas and is less susceptible to the effect of the gas. The specific gravity of the metal constituting the metal foil is preferably 6 or more, and the specific gravity of the metal constituting the metal foil is more preferably 7 or more. The specific gravity of the metal is preferably 20 or less in terms of the practical metal and in the case of attaching importance to weight reduction, more preferably 10 or less.

(Thicknesses of Metal Foil and Laminate Resin)

The thickness of the metal foil is preferably from 15 to 150 μm, more preferably from 40 to 120 If the metal foil is thin, the amount of metal for forming a weld metal lacks and a welding defect is readily generated or deformation of the metal is also likely to occur, making it difficult to control the welding. On the other hand, if the metal foil is too thick, the weight of the container itself is increased, and the advantage of using a laminated metal foil is reduced. The thickness of the laminate resin for heat sealing is preferably from 10 to 200 μm, more preferably from 15 to 100 μm. If the laminate resin is thin, the amount of the resin melted during heat sealing is too small, and a sealing defect where a resin is not present between metal foils starts occurring. On the other hand, if the laminate resin is too thick, a decomposition gas giving rise to the blowing-off of molten metal during melting and the resulting occurrence of a welding defect is evolved in a large amount to extremely narrow the range of welding conditions for forming a good weld part and moreover, the distance between a metal foil and a metal foil to be welded is excessively broadened to cause separation of the molten metal, failing in accomplishing the welding.

As described above, there is a tendency that the resistance against the decomposition gas of the heat-sealing resin is increased as the metal foil is thicker and the evolution of the decomposition gas is reduced as the heat seal resin is thinner, and therefore, as the ratio between the thickness of the metal foil and the thickness of the heat seal resin, i.e., (thickness of metal foil)/(thickness of heat seal resin), is larger, the weldability is more improved. The ratio is suitably 0.7 or more, more suitably 1.2 or more.

(Heat Sealed Part and Weld Part)

The width of the heat sealed part (path width) varies depending on the structure or purpose but is generally from 1 to 50 mm, preferably from 2 to 20 mm, more preferably from 3 to 7 mm. In the present invention, a weld bead is formed and therefore, the width may be narrower than in the conventional technique using only heat sealing, but if the width of the heat sealed part is too narrow, the sealability of the heat sealed part becomes insufficient.

In the present invention, in order to form a weld bead without impairing the heat seal, the weld bead is preferably formed from the end faces of the metal foils to a location outside the heat seal part with a space therebetween. However, if possible, the weld bead may be formed from the end face side of the metal foil or from the top and bottom surface sides of the metal foil in a manner of continuing to a part of the heat seal part, or the heat seal part may be present on the outer side other than on the inner side of the weld bead.

Incidentally, as regards a storage cell case having a structure where an electrode tab is fixed to an exterior part of the storage case to penetrate the heat seal part, the portion having the electrode tab cannot be welded and therefore, in the case of sealing by welding, the maximum weld sealing perimeter is the outer circumference terminating just proximal to the electrode tab. In the case of heat sealing, the portion including the electrode tap can also be heat-sealed, the whole circumference is the maximum heat-seal sealing perimeter.

The storage case may be fabricated by folding a laminated metal foil in half, arranging one side in a folded/bent structure, and arranging three sides in a sealed structure by heat sealing and welding. However, in the present invention, since a metal foil having a relatively high melting point is used, a metal foil having a relatively high strength tends to be used and, in the folded/bent part, a curvature radius small enough to sufficiently withstand welding is sometimes difficult to obtain. Even when the foil has a high strength, in the case of a bare metal foil, the curvature radius can be made small by pressing under a strong load, but, in the case of a laminated metal foil, the processing is applied under a load not impairing the laminate resin and, therefore, if the strength of the metal foil is high, the curvature radius can be hardly made small. In addition, the folded/bent part becomes a singularity point greatly differing in the metal amount for the unit weld line length as well as in the amount of metal responsible for heat conduction from other superposing parts and, in turn, readily produces a welding defect that may lead to an impairing of the gas barrier property. Accordingly, although not limitative, in the present invention, a structure where two laminated metal foils are used and stacked one on another is preferred.

(Life-Extending Effect)

As stated in BACKGROUND ART, in the case of a battery cell where a laminated metal foil is joined only by heat sealing, the heat-sealed portion may serve as a leakage path for an electrolytic solution within the battery or an intrusion path through which water vapor or the like enters the inside from the external environment, and the path length of the heat sealed part becomes one factor in the determination of life of the battery cell. In particular, intrusion of water vapor=water into the inside from the external environment is a very significant cause of shortening of the battery cell life. In a structure where the periphery is heat-sealed, the cross-sectional area of the water intrusion path is increased in proportion to the perimeter and therefore, as the heat sealing perimeter is longer, the flow rate of intruding water is increased and the life is shortened. As the path length of the heat seal part is shorter and the heat sealed perimeter is longer, the effect of intrusion of water is greater.

On the other hand, the laser-welded portion forms a gas barrier by a metal and, compared with the resin, water only in a negligible amount is allowed to intrude through the welded portion. That is, the effect of water on the battery cell life can be reduced by a ratio of the peripheral length sealed by welding. Roughly, the flow rate of intruding water is proportional to the life shortening effect, and the flow rate of intruding water is proportional to the non-welded peripheral length. Therefore, when a half of the peripheral length can be welded, compared with joining by absolutely no welding but only by heat sealing, the amount of intruding water is halved and the life attributable to water is doubled. When 90% or more of the peripheral length can be welded, the amount of intruding water decreases to one-tenth or less and the life attributable to water increases tenfold or more. When the entire periphery of the battery cell is welded, intrusion of water must be completely prevented, but since the electrode tab portion cannot be welded, a resin seal (heat seal) is applied to this portion.

Of the laminated metal foil for use in the container of the present invention, the surface not coated with a heat seal resin, that is, the surface usually working out to the outer surface of the container, may be the metal foil surface as it is or may be subjected to oxide formation, plating/coating or various resin laminations. In particular, in the case where a coat thinner than a heat seal resin is applied, the coat does not affect the welding, and a laminated metal foil with the outer surface being coated so as to impart functions such as insulation and heat dissipation is encompassed by the category of the present invention. Among others, from the economical aspect and also from the aspect of processability at the time of embossing, it is preferable to coat the outer surface with a PET film having a thickness of 20 μm or less and thereby impart an insulation property.

The heat seal resin on the inner surface side need not be a single layer, and it is also possible to apply a plurality of resin laminate layers, for example, by laminating an acid-modified polypropylene layer on the side in contact with the metal layer, thereby enhancing the adherence to metal, and laminating, as an outer layer thereof, a polypropylene layer improved in the heat sealability.

Furthermore, on the inner surface side, when using the container for a storage case or the like, the metal surface may be subjected to a surface treatment so as to enhance an electrolytic solution resistance, and various chromate treatments such as electrolytic chromate and resin chromate or other chromate-free conversion treatments may be applied. Incidentally, tin-free steel that is a product already subjected to a surface treatment with a chromium-containing solution has a high electrolytic solution resistance equal to that of the metal surface to which various chromate treatments are applied.

(Structure of Battery Case and Production Method Thereof)

Figure 2:
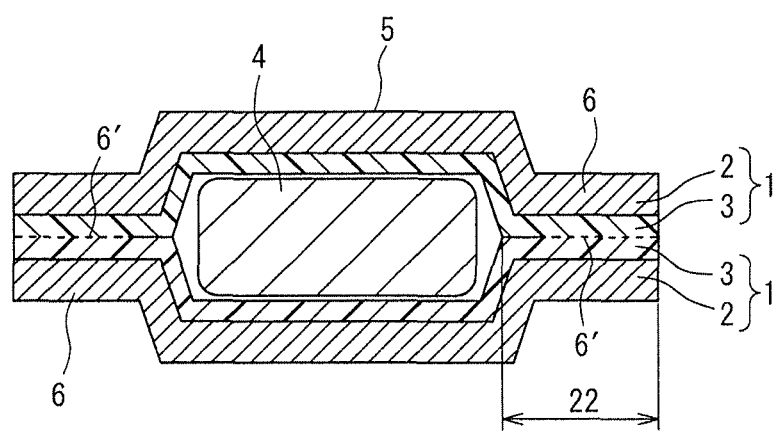
FIG. 2 A structural schematic view of a conventional battery cell without a sealing weld part.

FIG. 2 shows a structure of a conventional jacketed storage device, where a storage device 4 such as a battery or capacitor is covered with a laminated metal foil 1 by embossing, and the periphery 6 of the storage device 4 is heat-sealed 6'. The laminated metal foil 1 is fabricated by laminating a metal foil 2 and a heat sealing resin 3. In the case of the conventional jacket of FIG. 2, the path length of the heat sealed part is indicated by 22 and is equal to the total path length of the sealed part.

Figure 3A:
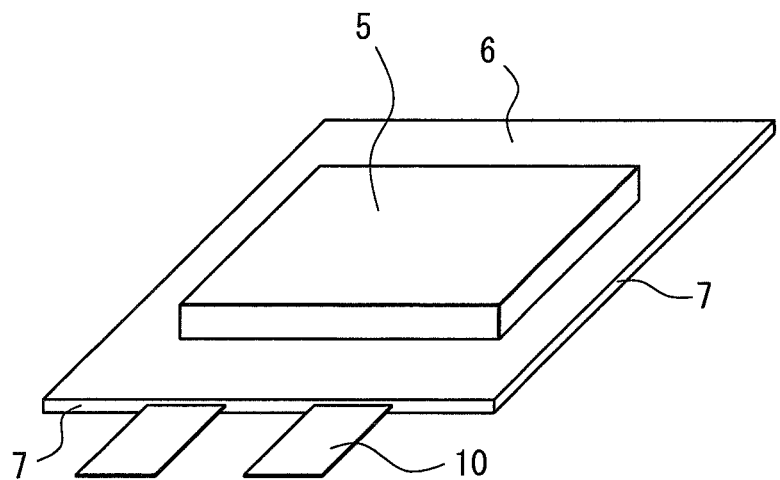
FIG. 3A is a schematic appearance view of a storage cell of the present invention.

FIG. 3A is a perspective view of a storage device jacketed according to the present invention, where although the outer appearance is almost the same as that of the conventional jacketed storage device, an embossing part 5 and a heat sealed part 6 are provided and an electrode tab 10 connected to the storage device is withdrawn from one end.

Figure 3B:
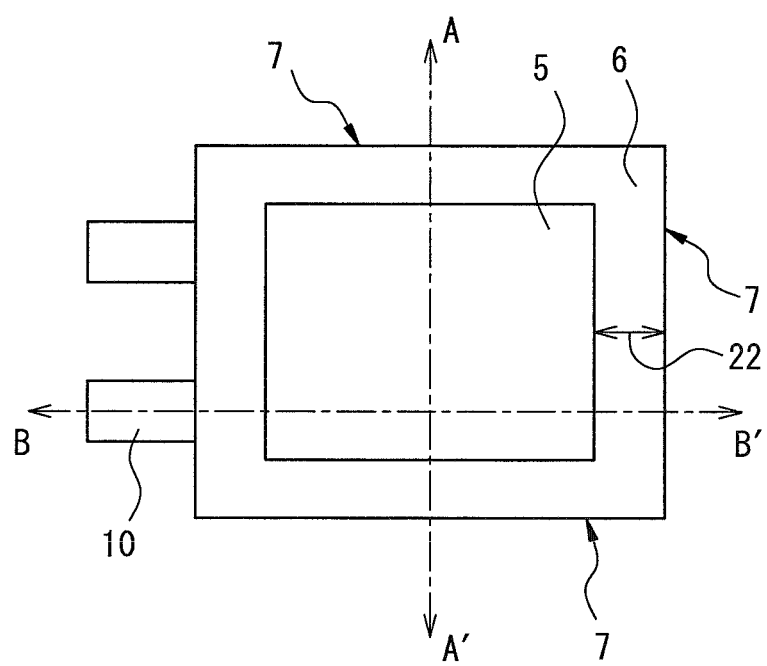
FIG. 3B is a top view of a storage cell of the present invention.

FIG. 3B is a top view of the jacketed storage cell of FIG. 3A, where an embossing part 5, a heat seal part 6 and an electrode tab 10 are depicted. FIG. 1 is a cross-sectional view along with the cross-sectional line A-A' not passing the electrode tab 10 shown in the figure above. However, in FIG. 1, for the sake of schematically illustrating the structure, the thickness of the laminated metal foil and the size of the weld part 7 are depicted as larger than reality relative to the storage device 4. In FIG. 1, similarly to FIG. 2, a storage device 4 is covered with a laminated metal foil 1 by embossing, and the periphery 6 of the storage device 4 is heat-sealed 6'. The jacketed storage device of the present invention differs from the conventional jacketed storage device in that the lateral end part of the laminated metal foil 1 for jacketing in the periphery of the storage device 4 is further laser-welded (butt-welded) from the end face side and a laser welding part 7 is thereby formed. In FIG. 1, the path length of the heat seal part is indicated by 23. The total path length of the seal part is a length to the end of the weld part, indicated by 22.

FIG. 4 shows a cross-sectional photograph of the heat seal part 6 and the laser welding part 7 of a jacketed storage device actually fabricated by applying heat sealing and laser welding. Top and bottom two metal foils (looking white resulting from light reflection) 2 are welded 7 at the end face part. A heat-sealed resin 6' is seen in the inside of the laser welding part 7. The resin 9 outside the metal foil 2 is an outer-surface resin film. 24 is an embedding resin for photography.

The laser welding part 7 may be formed suitably, as shown in FIG. 5, by irradiating the lateral end face of the laminated metal foils 2 with laser light 8 from the outside after applying heat sealing 6'. However, in the present invention, the method for forming a weld bead is not limited to laser welding, and even in the laser welding, the laser irradiation method is not limited to the embodiment of FIG. 5.

The method for laser welding may be a known method. For example, a carbon dioxide laser, a semiconductor laser or the like can be used as the ray source, and laser light through a fiber, laser light converged by a lens, or laser light reflected using a reflecting mirror may be used.

FIG. 6 is a cross-section along with the cross-sectional line B-B' passing the electrode tab of FIG. 3B. An electrode tab seal material 11 is formed on the electrode tab 10 surface, and the heat-sealing resin 6" of the laminated metal foil is heat-sealed to the electrode tab seal material 11. In the portion having this electrode tab 10, a metal foil cannot be laser-welded and therefore, a laser welding part 7 is not present, resulting in a structure only by heat sealing 6". In the present invention, it is preferred that all portions, except for the electrode tab, are welded (laser-welded).

In the embodiment shown in FIGS. 3A to 6, the electrode tabs are formed such that both tabs are withdrawn from one end side, but the tabs may be separately withdrawn from opposite ends or may be withdrawn from different end parts.

EXAMPLES

Example 1

For studying the effect of the specific gravity and melting point of the metal foil on the laser weldability after heat sealing, various metal foils shown in Table 1 were prepared and each was subjected to lamination on one surface or both surfaces, and weld bead formation by laser welding was examined.

Heat seal resins used are as follows.

PET12 and PET25 are a biaxially stretched PET (polyethylene terephthalate) film having a thickness of 12 μm and 25 μm, respectively, and EMBLET PET, produced by Unitika Ltd. was used.

Ny15 is a stretched nylon film having a thickness of 15 μm, and EMBLEM ON produced by Unitika Ltd. was used.

As for the outer-surface resin above, a urethane-based adhesive (Aron Mighty PU7000D, produced by Toagosei Co., Ltd.) was coated on the metal foil surface, and the outer surface-side resin was stacked thereon and pressure-bonded under curing conditions of 0.1 MPa, 25° C. and 90 minutes.

As the inner surface-side resin that is a heat-sealing resin, a film produced by non-stretch forming a raw material resin into a film shape (width: 300 mm) by an extrusion molding machine equipped with a T-die at an extrusion temperature of 250° C. was used.

Film for Inner Surface (1) was prepared by forming NOVATEC-PP EA7A produced by Japan Polypropylene Corporation as a raw material resin into a film having a thickness of 25 μm. Film for Inner Surface (2) was prepared by forming ADMER QE060 produced by Mitsui Chemicals Tohcello, Inc. as a raw material resin into a film having a thickness of 25 μm. Film for Inner Surface (3) was prepared by forming ADMER QE060 produced by Mitsui Chemicals Tohcello, Inc. into a film having a thickness of 50 μm. Inner-Surface Resin A was prepared by stacking Films for Inner Surface (1) and (2) and then laminating the stack while arranging Film for Inner Surface (2) on the metal foil side. Inner-Surface Resin B was prepared by laminating Film for Inner Surface (3) alone. Both Inner-Surface Resin A and Inner-Surface Resin B have a thermal decomposition temperature of 430° C.

As the metal foil, a rolled foil was mainly used, but for some metal species difficult of foil production by rolling, an alloy having a predetermined composition was vacuum-melted and made into a foil shape by a single rolling method, and this foil ribbon was crystallized by heat treatment and used. As for the rolled foil, a foil having a size of 100×100 mm was used, and as for the foil rolled by a single rolling method, a foil having a size of 100×30 mm was used. The thickness was 100 μm in all foils.

As the tin-free steel foil, Can Super manufactured by Nippon Steel Corp., which is a product steel sheet of tempering degree: T4CR, steel grade: MR, surface finish: normal finish, and thickness: 0.18 mm, was used after grinding one surface and thereby reducing the total thickness to a predetermined thickness. The surface on which plating remains was used as the inner surface. The metal species was simply denoted by TFS.

As the nickel plated foil, SUPERNICKEL manufactured by Nippon Steel Corp., which is a product steel sheet of tempering degree: T2, guaranteed minimum thickness of plating layer: 3 μm, surface finish: B, and thickness: 0.25 mm, was used after grinding one surface and thereby reducing the total thickness to a predetermined thickness. The surface on which plating remains was used as the inner surface. The metal species was simply denoted by SN.

A predetermined resin film for an inner surface shown in Table 1 was laminated on each metal foil and hot pressed under the conditions of 200° C., 1 MPa and 1 minute to produce a laminated metal foil.

Each resin was of a size larger than the metal foil and laminated in such a manner that the resin protrudes from the metal foil, and after the lamination, the sample shape was trimmed to the metal foil shape by cutting with a cutter.

Two sheets of the same laminated metal foil were heat-sealed in a width of 5 mm at the end face to produce an end-face heat-sealed sample. In the heat sealing, a heat seal tester having an aluminum-made heat seal bar was used and after holding at a set temperature of 190° C. and a pressure of 0.5 MPa for 5 seconds, the sample was air-cooled.

TABLE 1

| Example | | Metal Species | Density | Melting Point | Outer-Surface Resin | Inner-Surface Resin | Soundness of Resin | Score of Weldability |
|---|---|---|---|---|---|---|---|---|
| Invention | 1 | SUS304 | 7.93 | 1400 | none | A | A | 5 |
| Invention | 2 | SUS304 | 7.93 | 1400 | none | A | A | 5 |
| Invention | 3 | SUS304 | 7.93 | 1400 | PET12 | A | A | 5 |
| Invention | 4 | SUS304 | 7.93 | 1400 | PET12 | B | A | 5 |

TABLE 1-continued

| Example | | Metal Species | Density | Melting Point | Outer-Surface Resin | Inner-Surface Resin | Soundness of Resin | Score of Weldability |
|---|---|---|---|---|---|---|---|---|
| Invention | 5 | SUS304 | 7.93 | 1400 | PET25 | A | A | 5 |
| Invention | 6 | SUS304 | 7.93 | 1400 | Ny15 | A | A | 5 |
| Invention | 7 | SUS430 | 7.7 | 1430 | none | A | A | 5 |
| Invention | 8 | SUS430 | 7.7 | 1430 | PET12 | A | A | 5 |
| Invention | 9 | SUS430 | 7.7 | 1430 | none | B | A | 5 |
| Invention | 10 | SPCC | 7.85 | 1530 | none | A | A | 5 |
| Invention | 11 | SPCC | 7.85 | 1530 | PET12 | A | A | 5 |
| Invention | 12 | SPCC | 7.85 | 1530 | none | B | A | 5 |
| Invention | 13 | SPCC | 7.85 | 1530 | PET12 | B | A | 5 |
| Invention | 14 | Cu | 8.9 | 1085 | none | A | A | 5 |
| Invention | 15 | Ni | 8.85 | 1455 | none | A | A | 5 |
| Invention | 16 | Zr | 6.53 | 1852 | none | A | B | 4 |
| Invention | 17 | V | 5.8 | 1890 | none | A | B | 3 |
| Invention | 18 | Al—70Fe | 5 | 1380 | none | A | A | 3 |
| Invention | 19 | Al—80Fe | 5.69 | 1470 | none | A | A | 4 |
| Invention | 20 | Al—90Fe | 6.61 | 1510 | none | A | A | 5 |
| Invention | 21 | Zn—35Cu | 7.68 | 835 | none | A | A | 4 |
| Invention | 22 | Zn—20Cu | 7.43 | 710 | none | A | A | 3 |
| Invention | 23 | TFS-1 | 7.85 | 1530 | PET12 | A | A | 5 |
| Invention | 24 | SN-1 | 7.85 | 1530 | PET12 | A | A | 5 |
| Comparative Example | 1 | Ti | 4.54 | 1675 | none | A | B | 2 |
| Comparative Example | 2 | Zn | 7.12 | 420 | none | A | A | 1 |
| Comparative Example | 3 | Al | 2.69 | 660 | none | A | A | 1 |
| Comparative Example | 4 | Al—15Fe | 3 | 1004 | none | A | A | 1 |
| Comparative Example | 5 | Al—50Fe | 4.02 | 1175 | none | A | A | 1 |
| Comparative Example | 6 | Zn—15Cu | 7.36 | 650 | none | A | A | 1 |

For the evaluation of soundness of the welded part, the sample was heat-sealed and welded by taking the 100 mm-long side as the end face, and for the evaluation of soundness of the resin after welding, a laminated metal foil sample of 15 mm×50 mm was separately produced and heat-sealed and welded by taking the 15 mm-long side as the end face.

The heat-sealed end face was irradiated with a laser from the opposing direction to Ogami-weld the end face. Laser radiation was emitted by using ISL-1000F of Nippon Steel Techno Research Corporation as the light source and using pure Ar gas as the seal gas, at an output of 180 W and a scanning speed of 2 m/min. The laser light was condensed to a diameter of 0.5 mm in the weld part.

The sound weld length was measured from the outer appearance of the weld end face, and the rating of weldability was score 1 when the ratio of the sound weld length to the welding execution length was less than 20%, score 2 when from 20% to less than 50%, score 3 when from 50% to less than 90%, score 4 when from 90% to less than 99%, and score 5 when 99% or more. Score 3 or higher was judged as passed.

As for the sample in the evaluation of soundness of the resin after welding, a T-peel test was performed by subjecting a sample with the end face being heat-sealed and welded in a width of 15 mm to opening on the side opposite the weld part, and the adherence of the heat seal resin in front of the weld part was examined. The soundness of resin was rated A when, compared to a sample not subjected to welding, the heat seal strength maintained was 90% or more, rated B when from 70% to less than 90%, and rated C when less than 70%.

As seen from Table 1, in the laminated metal foil of the present invention using a metal foil having a specific gravity of 5 or more and having a melting point higher by 300° C. or more than the decomposition temperature of the heat seal resin, the weldability was good and the resin was sound.

Example 2

A test for confirming that in the cell case of the structure according to the present invention, the amount of water vapor intruding from the external environment can be reduced than in the conventional cell case was performed. An electrolytic solution for a lithium battery was put between two laminated metal foils together with a polypropylene-made small block for ensuring a space to hold the solution, and four sides were heat-sealed to produce a simulated cell as a comparative test body. Furthermore, four sides of a simulated cell having the same structure, at ends outside the heat seal, were metallically sealed by laser welding to produce a simulated cell as a test body of the structure according to the present invention. A constant temperature and humidity test of holding the test body in a high-temperature high-humidity environment was performed and after a certain period of time, the amount of internal water was measured to examine the intrusion behavior of water (water vapor).

As the metal foil of the test body, a pure aluminum foil (model number: AL-013265, thickness: 50 μmt) of Nilaco Corporation and an SUS304 stainless steel foil 100 μmt of Nippon Steel Materials Co., Ltd. were used.

As the outer-surface film, EMBLET PET #12 (biaxially stretched PET (polyethylene terephthalate) film having a thickness of 12 μm) produced by Unitika Ltd. was used, and after coating a urethane-based adhesive (Aron Mighty PU7000D, produced by Toagosei Co., Ltd.) on the metal foil surface, the outer-surface film was stacked thereon and pressure-bonded under curing conditions of 0.1 MPa, 25° C. and 90 minutes.

As the inner surface-side resin that is a heat seal resin, Inner-Surface Resin A employed in Example 1 was used and tightly contacted with the metal foil by the same method to produce a laminated metal foil.

In preparing the test body, two sheets of the same laminated metal foil that was cut into a square of 150 mm×150 mm were paired, and three sides were heat-sealed in a width of 5 mm or 10 mm to form a bag shape. A 1 mm-thick polypropylene piece with a size of 30 mm×30 mm was inserted between two laminated metal foils at one unsealed side of the bag-shaped test body. This polypropylene piece was held near the center in the plane of 150 mm×150 mm to ensure a cavity between a foil and a foil in its periphery and put an electrolytic solution into the cavity.

In a glove box purged with a dry argon gas having a dew point of −80° C. or less, 3.5 g of an electrolytic solution was injected into the cavity of each test body, and the remaining one side was heat-sealed in the same width as in other three sides to prepare a simulated cell test body hermetically sealed by heat sealing.

The test body simulating the structure of the present invention was produced by further laser-welding four sides of the simulated cell above. Since a test body using an aluminum foil for the metal foil could not be welded, in the test body of the structure of the present invention, a stainless steel foil was used for the metal foil. The level of the test body is shown in Table 2.

As result of a simulation test, the electrolytic solution did not contain a lithium salt, and a solvent obtained by mixing equal volumes of ethylene carbonate and ethylmethyl carbonate was used.

In the welding, the heat-sealed end face was irradiated with laser from the opposing direction to Ogami-weld the end face. Laser radiation was emitted by using ISL-1000F of Nippon Steel Techno Research Corporation as the light source and using pure Ar gas as the seal gas, at an output of 180 W and a scanning speed of 2 m/min. The laser light was condensed to a diameter of 0.5 mm in the weld part.

TABLE 2

| Metal Foil | Heat Seal Width | Welded or Not Welded |
|---|---|---|
| SUS304 | 5 mm | welded |
| SUS304 | 5 mm | not welded |
| Aluminum | 5 mm | not welded |
| Aluminum | 10 mm | not welded |

In the constant temperature and humidity test, all test bodies were placed at the same time in a constant temperature and humidity bath HIFLEX FX724P of Kusumoto Chemicals, Ltd. and held under the conditions of 35° C. and 90% RH. After the constant temperature and humidity test for a predetermined time, the electrolytic solution in the inside was taken out by cutting the laminated metal foil in a glove box purged with a dry argon gas having a dew point of −80° C. or less, and the water content in the electrolytic solution was measured using a water vaporizer CA-100 of Mitsubishi Chemical Analytech Co., Ltd.

Figure 7:
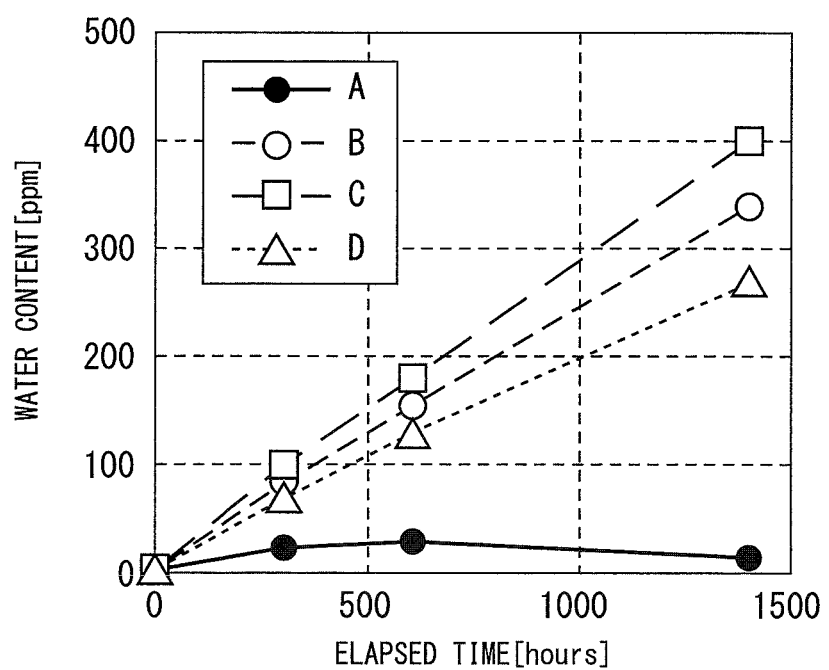
FIG. 7 A graph of evaluation test results of the barrier property against water intrusion, which is a graph showing the relationship between the amount of water intruding into the inside from the outside of the sealed container and the evaluation test time.

FIG. 7 shows the test results in a graph by indicating the elapsed time of the constant temperature and humidity test on the abscissa and indicating the water amount in the electrolytic solution on the ordinate.

As apparent from FIG. 7, in the levels B, C and D of not welded, the water amount is increased with the elapse of time, whereas in level A that is the structure of the present invention subjected to welding, the water amount is scarcely increased even with the elapse of time and a remarkable barrier property against water intrusion is exhibited.

Example 3

In order to examine the effect of thickness of the metal foil, the same weldability test as in Example 1 and the same water intrusion barrier test as in Example 2 were performed at the levels shown in Table 3 by using metal foils having various thicknesses. However, in the water intrusion barrier test, the rating was score 6 when the amount of intruding water after 1,400 hours in terms of the elapsed time of the constant temperature and humidity test is 30 ppm or less, score 5 when from more than 30 ppm to 50 ppm, score 4 when from more than 50 ppm to 100 ppm, score 3 when from more than 100 ppm to 150 ppm, score 2 when from more than 150 ppm to 200 ppm, and score 1 when more than 200 ppm. Score 3 or higher was judged as passed.

The weldability or resin soundness was slightly varied depending on the thickness of the metal foil, but the welding could be successfully performed in all samples. The amount of intruding water was slightly varied in accordance with the variation in the weldability or resin soundness, but the barrier property against water intrusion did not fall below the predetermined score in all samples.

TABLE 3

| Example | | Metal Species | Foil Thickness | Outer-Surface Resin | Inner-Surface Resin | Soundness of Resin | Score of Weldability | Water Permeability |
|---|---|---|---|---|---|---|---|---|
| Invention | 31 | SUS304 | 10 | none | A | B | 3 | 3 |
| Invention | 32 | SUS304 | 16 | none | A | A | 3 | 4 |
| Invention | 33 | SUS304 | 35 | PET12 | A | A | 3 | 4 |
| Invention | 34 | SUS304 | 42 | PET12 | B | A | 4 | 5 |
| Invention | 35 | SUS304 | 55 | PET25 | A | A | 4 | 5 |
| Invention | 36 | SUS304 | 75 | Ny15 | A | A | 4 | 5 |
| Invention | 37 | SUS304 | 80 | none | A | A | 5 | 6 |
| Invention | 38 | SUS304 | 85 | PET12 | A | A | 5 | 6 |
| Invention | 39 | SUS304 | 100 | PET12 | B | A | 5 | 6 |
| Invention | 40 | SUS304 | 110 | PET25 | A | A | 5 | 6 |
| Invention | 41 | SUS304 | 150 | PET12 | A | B | 5 | 6 |
| Invention | 42 | SUS430 | 20 | none | B | A | 3 | 4 |
| Invention | 43 | SUS430 | 85 | PET12 | B | A | 5 | 6 |
| Invention | 44 | SUS430 | 100 | PET12 | A | A | 5 | 6 |
| Invention | 45 | SUS430 | 115 | none | A | A | 5 | 6 |
| Invention | 46 | SUS430 | 125 | none | A | B | 5 | 6 |
| Invention | 47 | SUS430 | 140 | PET25 | A | B | 5 | 6 |
| Invention | 48 | TFS | 75 | none | A | A | 4 | 5 |
| Invention | 49 | TFS | 85 | none | A | A | 5 | 6 |
| Invention | 50 | TFS | 100 | PET12 | A | A | 5 | 6 |
| Invention | 51 | TFS | 120 | none | A | A | 5 | 6 |
| Invention | 52 | TFS | 150 | none | A | B | 5 | 6 |
| Invention | 53 | SN | 90 | PET12 | A | A | 5 | 6 |
| Invention | 54 | SN | 110 | PET12 | A | A | 5 | 6 |

DESCRIPTION OF REFERENCE NUMERALS

A-A': Line (dashed line) showing the cut line position for the cross-section of a battery cell without an electrode tab.
B-B': Line (dashed line) showing the cut line position for the cross-section of a battery cell with an electrode tab.
1: Laminated metal foil for laser welding
2: Metal foil
3: Heat seal resin
4: Storage cell portion (storage device)
5: Embossing part for housing a battery cell
6': Heat sealed part for cutting off a battery cell from the outside world
6": Electrode tab seal material
7: Laser welding part (metallically sealed part)
7': Weld part
8: Laser light for welding
9: Outer-surface resin film
10: Metal foil (electrode tab)
22: Total path length of seal part
23: Path length of heat sealed part
24: Embedding resin
27: Welding defect
27': Position of welding defect (unseen from the outside)
28: Welding jig

The invention claimed is:

1. A resin-metal composite sealed container having:
a first metal foil having an end part,
a second metal foil having an end part,
a heat sealed part using a heat-sealing resin, between said end part of said first metal foil and said end part of said second metal foil, and
a metallically sealed part with a weld bead, on an end face outside said heat sealed part of said first metal foil and said second metal foil, the weld bead formed from the end parts of the first metal foil and the second metal foil to a location outside the heat sealed part with a space therebetween, wherein:
the melting point of the metal constituting said metal foil is higher by 300° C. or more than the thermal decomposition temperature of said heat-sealing resin,
the specific gravity of the metal constituting said metal foil is 5 or more, and
said weld bead is formed by a laser welding.

2. The resin-metal composite sealed container according to claim 1, wherein said metallically sealed part of said first metal foil and said second metal foil is a weld bead formed by heating said first metal foil and said second metal foil from a side of said end face thereof.

3. The resin-metal composite sealed container according to claim 2, wherein said weld bead is a weld bead having a substantially circular cross-sectional shape and the dimension of the weld bead in the thickness direction of the metal foil is from 1.1 to 5.0 times the thickness-direction dimension of said first metal foil and said second metal foil in the portion coming into contact with said weld bead.

4. The resin-metal composite sealed container according to claim 2, wherein said first metal foil and said second metal foil are bridged by said weld bead and the thickness-direction dimension of said first metal foil and said second metal foil near said weld bead is equal to the thickness-direction dimension of said first metal foil and said second metal foil in said heat seal part.

5. The resin-metal composite sealed container according to claim 1, wherein said weld bead is a weld bead having a substantially circular cross-sectional shape and the dimension of the weld bead in the thickness direction of the metal foil is from 1.1 to 5.0 times the thickness-direction dimension of said first metal foil and said second metal foil in the portion coming into contact with said weld bead.

6. The resin-metal composite sealed container according to claim 5, wherein said first metal foil and said second metal foil are bridged by said weld bead and the thickness-direction dimension of said first metal foil and said second metal foil near said weld bead is equal to the thickness-direction dimension of said first metal foil and said second metal foil in said heat seal part.

7. The resin-metal composite sealed container according to claim 1, wherein said first metal foil and said second metal foil are bridged by said weld bead and the thickness-direction dimension of said first metal foil and said second metal foil near said weld bead is equal to the thickness-direction dimension of said first metal foil and said second metal foil in said heat seal part.

8. The resin-metal composite sealed container according to claim 1, wherein a heat-sealing resin layer is laminated on at least the inner surface of said first metal foil and at least the inner surface of said second metal foil.

9. The resin-metal composite sealed container according to claim 1, wherein said metallically sealed part is formed on the entire circumference of the end parts of said first metal foil and said second metal foil, excluding an electrode tab portion.

10. The resin-metal composite sealed container according to claim 1, wherein said metal foil is stainless steel foil and said heat-sealing resin is a resin mainly composed of polypropylene.

11. The resin-metal composite sealed container according to claim 1, wherein said metal foil has a thickness of 15 to 150 μm and said heat-sealing resin has a thickness of 10 to 200 μm.

12. A method for producing a metal-resin composite sealed container, comprising:
forming a container by subjecting end parts of metal foils having laminated on at least one surface thereof a heat-sealing resin to sealing by heat sealing, and
forming a metallically sealed part with a weld bead on the end faces of said metal foils by heating/welding an outer location than the heat sealed part of said container from a side of the end faces of the metal foils without removing the resin near a part to be welded before welding, the weld bead formed from the end faces of the metal foils to a location outside the heat sealed part with a space therebetween, wherein:
the melting point of the metal constituting said metal foils is higher by 300° C. or more than the thermal decomposition temperature of said heat-sealing resin,
the specific gravity of the metal constituting said metal foils is 5 or more, and
said weld bead is formed by a laser welding.

* * * * *